(12) United States Patent
Bara et al.

(10) Patent No.: US 9,162,191 B2
(45) Date of Patent: Oct. 20, 2015

(54) IMIDAZOLE-CONTAINING POLYMER MEMBRANES AND METHODS OF USE

(71) Applicant: Board of Trustees of The University of Alabama, Tuscaloosa, AL (US)

(72) Inventors: Jason E. Bara, Tuscaloosa, AL (US); Matthew S. Shannon, Northport, AL (US)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 14/080,836

(22) Filed: Nov. 15, 2013

(65) Prior Publication Data

US 2014/0130416 A1    May 15, 2014

Related U.S. Application Data

(60) Provisional application No. 61/726,718, filed on Nov. 15, 2012.

(51) Int. Cl.
*B01D 53/22* (2006.01)
*B01D 71/62* (2006.01)
*C10L 3/10* (2006.01)

(52) U.S. Cl.
CPC ............... *B01D 71/62* (2013.01); *B01D 53/22* (2013.01); *B01D 53/228* (2013.01); *B01D 2256/24* (2013.01); *B01D 2257/504* (2013.01); *C10L 3/104* (2013.01); *Y02C 10/10* (2013.01)

(58) Field of Classification Search
CPC ............... Y02C 10/10; B01D 53/228; B01D 2257/504; B01D 53/22; B01D 71/64; B01D 71/62; B01D 2256/24; C10L 3/104
See application file for complete search history.

(56) References Cited

U.S. PATENT DOCUMENTS

| | | | |
|---|---|---|---|
| 3,935,086 A * | 1/1976 | Misumi et al. | 204/530 |
| 6,372,499 B1 * | 4/2002 | Midoux et al. | 435/455 |
| 6,489,376 B1 | 12/2002 | Khudyakov et al. | |
| 6,869,715 B2 * | 3/2005 | Alvarez-Gallego et al. | 429/492 |
| 7,060,735 B2 * | 6/2006 | Taniguchi et al. | 521/27 |
| 7,521,015 B2 | 4/2009 | Cheng et al. | |
| 7,767,728 B2 | 8/2010 | Lu et al. | |
| 7,931,824 B2 * | 4/2011 | Gin et al. | 252/299.01 |
| 8,506,914 B2 * | 8/2013 | Bara | 423/226 |
| 8,623,124 B2 * | 1/2014 | Hosseini et al. | 96/4 |
| 8,673,956 B2 * | 3/2014 | Bara | 514/400 |
| 8,741,246 B2 * | 6/2014 | Bara | 423/226 |
| 8,926,732 B2 * | 1/2015 | Bara et al. | 95/44 |
| 2004/0101732 A1 * | 5/2004 | Alvarez-Gallego et al. | 429/33 |
| 2008/0029735 A1 * | 2/2008 | Gin et al. | 252/299.61 |
| 2008/0296305 A1 * | 12/2008 | Wyse et al. | 220/565 |

(Continued)

OTHER PUBLICATIONS

Joshi et al. "The Kinetics of Photoinitiated Polymerization of 1-Vinyl-2-Methylimidazole" Journal of Applied Polymer Science, vol. 27, 3151-3159 (1982) John Wiley & Sons, Inc.*

(Continued)

*Primary Examiner* — Jason M Greene
*Assistant Examiner* — Anthony Shumate
(74) *Attorney, Agent, or Firm* — Meunier Carlin & Curfman LLC

(57) ABSTRACT

Imidazole-containing polymer membranes are described herein. Methods of their preparation and use are also described herein. The methods of using the membranes include capturing and reducing volatile compounds from gas streams.

24 Claims, 2 Drawing Sheets

(56) References Cited

U.S. PATENT DOCUMENTS

| | | | | |
|---|---|---|---|---|
| 2008/0319202 | A1* | 12/2008 | Gin et al. | 548/300.1 |
| 2009/0171098 | A1 | 7/2009 | Bara et al. | |
| 2009/0291872 | A1* | 11/2009 | Bara et al. | 510/175 |
| 2009/0291874 | A1 | 11/2009 | Bara et al. | |
| 2011/0014100 | A1* | 1/2011 | Bara et al. | 423/229 |
| 2011/0192281 | A1* | 8/2011 | Hosseini et al. | 96/10 |
| 2011/0266223 | A1* | 11/2011 | Yang et al. | 210/651 |
| 2011/0311881 | A1* | 12/2011 | Benicewicz | 429/309 |
| 2012/0186446 | A1* | 7/2012 | Bara et al. | 95/44 |
| 2012/0248372 | A1* | 10/2012 | Bara | 252/184 |
| 2013/0098832 | A1* | 4/2013 | Matsuyama et al. | 210/489 |
| 2013/0143939 | A1* | 6/2013 | Bara | 514/400 |
| 2014/0017153 | A1* | 1/2014 | Bara | 423/229 |

OTHER PUBLICATIONS

Imoto et al. "Participation of Imidazole in Vinyl Polymerization in the Absence of Radical Initiator," J. Polymer Sci.: Part C No. 22, pp. 89-101 (1968).*

Wang et al. "Electrochemical and Chemical Polymerization of Imidazole and Some of Its Derivatives," Macromolecules 1994,27, 893-901.*

Acharya et al., CO oxidation with Pt(111) supported on pure and boron-doped carbon: A DFT investigation, Surface Sci., 602(23):3595-3602 (2008).

Acharya et al., Effect of boron doping in the carbon support on platinum nanoparticles and carbon corrosion, J. Power Sources, 192(2):324-329 (2009).

An et al., Electronic structure calculations of gas adsorption on boron-doped carbon nanotubes sensitized with tungsten, Chem. Phys. Letters, 482(4-6):274-280 (2009).

An et al., Chemisorption of Transition-Metal Atoms on Boron- and Nitrogen-Doped Carbon Nanotubes: Energetics and Geometric and Electronic Structures, J. Phys. Chem. C, 113(17):7069-7078 (2009).

An et al., Transition-Metal Strings Templated on Boron-Doped Carbon Nanotubes: A DFT Investigation, J. Phys. Chem. C, 113(34):15346-15354 (2009).

An et al., J. Phys. Chem. Lett., 1(15):2269-2273 (2010), Linking Carbon and Boron-Nitride Nanotubes: Heterojunction Energetcs and Band Gap Tuning.

An et al., Structural, electronic, and magnetic features of platinum alloy strings templated on a boron-doped carbon nanotube, Phys. Rev. B, 81(20):5433 1-8 (2010).

Anderson et al., Imidazole- and imidazolium-containing polymers for biology and material science applications, Polymer, 51(12):2447-2454 (2010).

Baker, Future Directions of Membrane Gas Separation Technology, Indust. Eng. Chem. Res., 41(6):1393-1411 (2002).

Baker et al., Natural Gas Processing with Membranes: An Overview, Indust. Eng. Chem. Res., 47(7):2109-2121 (2008).

Bara et al., Enhanced CO2 Separation Selectivity in Oligo(ethylene glycol) Functionalized Room-Temperature Ionic Liquids, Indust. Eng. Chem. Res., 46(16):5380-5386 (2007).

Bara et al., Synthesis and Performance of Polymerizable Room-Temperature Ionic Liquids as Gas Separation Membranes, Indust. Eng. Chem. Res., 46(16):5397-5404 (2007).

Bara et al., Influence of nanostructure on light gas separations in cross-linked lyotropic liquid crystal membranes, J. Membrane Sci., 288(1-2):13-19 (2007).

Bara et al., Effect of Anion on Gas Separation Performance of Polymer-Room-Temperature Ionic Liquid Composite Membranes, Indust. Eng. Chem. Res., 47(24):9919-9924 (2008).

Bara et al., Synthesis and light gas separations in cross-linked gemini room temperature ionic liquid polymer membranes, J. Membrane Sci., 316(1-2):186-191 (2008).

Bara et al., Improving CO2 selectivity in polymerized room-temperature ionic liquid gas separation membranes through incorporation of polar substituents, J. Membrane Sci., 321(1)3-7 (2008).

Bara et al., Improving CO2 permeability in polymerized room-temperature ionic liquid gas separation membranes through the formation of a solid composite with a room-temperature ionic liquid, Polym. Adv. Tech., 19(10):1415-1420 (2008).

Bara et al., Gas separations in fluoroalkyl-functionalized room-temperature ionic liquids using supported liquid membranes, Chemical Eng. J., 147(1):43-50 (2009).

Bara et al., Guide to CO2 Separations in Imidazolium-Based Room-Temperature Ionic Liquids, Indust. Eng. Chem. Res., 48(6):2739-2751 (2009).

Bara et al., Effect of "Free" Cation Substituent on Gas Separation Performance of Polymer-Room-Temperature Ionic Liquid Composite Membranes, Indust. Eng. Chem. Res., 48(9):4607-4610 (2009).

Bara et al., Room-Temperature Ionic Liquids and Composite Materials: Platform Technologies for CO2 Capture, Acct. Chem. Res., 43(1):152-159 (2010).

Bara, A Versatile and Scalable Method for Producing N-functionalized Imidazoles. Indust. Eng. Chem. Res., vol. 50 pp. 13614-13619 (2011).

Berendsen et al., The missing term in effective pair potentials, J. Phy. Chem., 91(24):6269-6271 (1987).

Bernardo et al., Membrane Gas Separation: A Review/State of the Art, Indust. Eng. Chem. Res., 48(10):4638-4663 (2009).

Bowen et al., Fundamentals and applications of pervaporation through zeolite membranes, J. Membrane Sci., 245(1-2):1-33 (2004).

Burgess et al., Boron-doped carbon powders formed at 1000 degrees C and one atmosphere, Carbon, 46 (13):1711-1717 (2008).

Camper et al., Bulk-fluid solubility and membrane feasibility of Rmim-based room-temperature ionic liquids, Indust. Eng. Chem. Res., 45(18):6279-6283 (2006).

Camper et al., Room-Temperature Ionic Liquid-Amine Solutions: Tunable Solvents for Efficient and Reversible Capture of CO2, Indust. Eng. Chem. Res., 47 (21):8496-8498 (2008).

Carlisle et al., Interpretation of CO2 solubility and selectivity in nitrile-functionalized room-temperature ionic liquids using a group contribution approach, Indust. Eng. Chem. Res., 47(18):7005-7012 (2008).

Carlisle et al., Main-chain imidazolium polymer membranes for CO2 separations: An initial study of a new ionic liquid-inspired platform, J. Membrane Sci., 359(1-2):37-43 (2010).

Chen et al., Predictions of selectivity and flux for CH4/H-2 separations using single walled carbon nanotubes as membranes, J. Membrane Sci., 269(1-2):152-160 (2006).

Cozmuta et al., Gas Sorption and Barrier Properties of Polymeric Membranes from Molecular Dynamics and Monte Carlo Simulations, J. Phys Chem B, 111(12):3151-3166 (2007).

De Luca, Naturally occurring and synthetic imidazoles: Their chemistry and their biological activities, Current Medicinal Chem., 13(1):1-23 (2006).

Deng et al., Facilitated transport of CO2 in novel PVAm/PVA blend membrane, J. Membrane Sci., 340(1-2):154-163 (2009).

Diedenhofen et al., COSMO-RS as a tool for property prediction of IL mixtures-A review, Fluid Phase Equilibria, 294(1-2):31-38 (2010).

Domotor et al., Atomistically modeling the chemical potential of small molecules in dense systems, J. Physical Chem. B, 108(7):2413-2417 (2004).

Eckert et al., Fast solvent screening via quantum chemistry: COSMOS-RS approach, Aiche J., 48(2):369-385 (2002).

Emel'Yanenko et al., Building blocks for ionic liquids: Vapor pressures and vaporization enthalpies of 1-(n-alkyl)-imidazoles, J. Chem. Thermodyn., 43(10):1500-1505 (2011).

Fennell et al., Is the Ewald summation still necessary? Pairwise alternatives to the accepted standard for long-range electrostatics, J. Chem. Phys., 124(23):4104 1-13 (2006).

Finotello et al., Room-temperature ionic liquids: Temperature dependence of gas solubility selectivity, Indust. Eng. Chem. Res., 47(10):3453-3459 (2008).

Finotello et al., Ideal gas solubilities and solubility selectivities in a binary mixture of room-temperature ionic liquids, J. Phys. Chem. B, 112(8):2335-2339 (2008).

Galassi et al., Phase-diagrams of diatomic-molecules using the gibbs ensemble monte-carlo method, Mol. Simulation, 13(1):11-24 (1994).

(56) References Cited

OTHER PUBLICATIONS

Gelb et al., Characterization of Porous Glasses: Simulation Models, Adsorption Isotherms, and the Brunauer-Emmett—Teller Analysis Method, Langmuir, 14(8):2097-2111 (1998).
Turner et al., Replica exchange for reactive Monte Carlo simulations, J. Phys. Chem. C, 111(43):15706-15715 (2007).
Turner, Monte Carlo simulation of equilibrium reactions at modified vapor-liquid interfaces, Langmuir, 23(5):2525-2530 (2007).
Turner et al., Simulation of chemical reaction equilibria by the reaction ensemble Monte Carlo method: a review, Mol. Simulation, 34(2):119-146 (2008).
Vlcek et al., Optimized Unlike-Pair Interactions for Water-Carbon Dioxide Mixtures Described by the SPC/E and EPM2 Models, J. Phy. Chem. B, 115(27):8775-8784 (2011).
Verevkin et al., Thermodynamics of Ionic Liquids Precursors: 1-Methylimidazole, J. Phys. Chem. B, 115(15):4404-4411 (2011).
Vieira-Linhares et al., Non-equilibrium molecular dynamics simulation of gas separation in a microporous carbon membrane, Chemical Eng. Sci., 58(18):4129-4136 (2003).
Voss et al., Physically Gelled Ionic Liquids: Solid Membrane Materials with Liquidlike $CO_2$ Gas Transport, Chemistry of Materials, 21(14):3027-3029 (2009).
Yao et al., Biomimetic material—poly(N-vinylimidazole)-zinc complex for $CO_2$ separation, Chem. Commun., 48:1766-1768 (2012).
Zhang et al., An optimized molecular potential for carbon dioxide, J. Chem. Phys., 122(21):214507 1-15 (2005).
Gergidis et al., Molecular dynamics simulation of n-butane-methane mixtures in silicalite, J. Phys. Chem. B, 103(17):3380-3390 (1999).
Gin et al., Designing the next generation of chemical separation membranes. Science (Washington, DC, U. S.), 332 (Copyright (C) 2011 American Chemical Society (ACS). All Rights Reserved.), pp. 674-676 (2011).
Grainger et al., Techno-economic evaluation of a PVAm $CO_2$—selective membrane in an IGCC power plant with $CO_2$ capture, Fuel, 87:14-24 (2008).
Green et al., Tailoring macromolecular architecture with imidazole functionality: A perspective for controlled polymerization processes, Euro. Polymer J., 47(4):486-496 (2011).
Hess et al., Algorithms for highly efficient, load-balanced, and scalable molecular simulation, J. Chem. Theory and Computation, 4(3):435-447 (2008).
Irvin et al., Demonstrating CCS Integration, Chemical Engineering Progress, 107 (8):53-56 (2011).
Hudiono et al., A three-component mixed-matrix membrane with enhanced $CO_2$ separation properties based on zeolites and ionic liquid materials, J. Membrane Sci., 350(1-2):117-123 (2010).
Johnson et al., Reactive canonical monte-carlo—a new simulation technique for reacting or associating fluids, Mol. Phys., 81(3):717-733 (1994).
Jorgensen et al., Development and testing of the OPLS all-atom force field on conformational energetics and properties of organic liquids, J. Amer. Chem. Soc., 118(45):11225-11236 (1996).
Kaminski et al., Performance of the AMBER94, MMFF94, and OPLS-AA force fields for modeling organic liquids, J. Phys. Chem., 100(46):18010-18013 (1996).
Keskin et al., Screening metal-organic framework materials for membrane-based methane/carbon dioxide separations, J. Phys. Chem. C, 111(38):14055-14059 (2007).
Kholod et al., Application of Quantum Chemical Approximations to Enviromental Problems: Prediction of Water Solubility for Nitro Compounds, Environ. Sci. Technol., 43(24):9208-9215 (2009).
Klamt et al., A new approach to dielectric screening in solvents with explicit expressions for the screening energy and its gradient, J. Chem. Soc., Perkin Trans., 2(5):799-805 (1993).
Klamt et al., Refinement and parametrization of COSMOS-RS, J. Phy. Chem. A, 102(26):5074-5085 (1998).
Lafrate et al., Diol-Functionalized Imidazolium-Based Room-Temperature Ionic Liquids with Bis (trifluoromethanesulfonimide) Anions that Exhibit Variable Water Miscibility. Indust. Eng. Chem. Res., 48 (18):8757-8759 (2009).
Lafrate et al., High Water Vapor Flux Membranes Based on Novel Diol-Imidazolium Polymers, Indust. Eng. Chem. Res., 49(23):11914-11919 (2010).
Lee et al., Development of the colle-salvetti correlation-energy formula into a functional of the electron-density, Phy. Rev. B, 37(2):785-789 (1988).
Lenarcik et al., The influence of the size and position of the alkyl groups in alkylimidazole molecules on their acid-base properties, J. Heterocyclic Chem., 39(2):287-290 (2002).
Li et al., Selective gas adsorption and separation in metal-organic frameworks. Chemical Society Reviews, 38(5):1477-1504 (2009).
Li et al., $CO_2$ Separation from Flue Gas Using Polyvinyl—(Room Temperature Ionic Liquid)—Room Temperature Ionic Liquid Composite Membranes, Indust. Eng. Chem. Res., 50(15):9344-9353 (2011).
Lin et al., Materials selection guidelines for membranes that remove $CO_2$ from gas mixtures, J. Mol. Struct., 739(1-3):57-74 (2005).
Lin et al., Gas and Vapor Solubility in Cross-Linked Poly(ethylene Glycol Diacrylate), Macromolecules, 38(20):8394-8407 (2005).
Martin et al., Transferable potentials for phase equilibria. 1. United-atom description of n-alkanes, J. Phys. Chem. B, 102(14):2569-2577 (1998).
McDonald et al., Development of an all-atom force field for heterocycles. Properties of liquid pyrrole, furan, diazoles, and oxazoles, J. Phy. Chem. B, 102(41):8049-8059 (1998).
Merkel et al., Power plant post-combustion carbon dioxide capture: An opportunity for membranes, J. Membrane Sci., 359(1-2):126-139 (2010).
NETL DOE/NETL Advanced Carbon Dioxide Capture R&D Program: Technology Update May 2011. http://www.neadoe.gov/technologies/coalpower/ewr/pubs/CO2CaptureTechUpdate051711.pdf (accessed Sep. 2, 2011), 516 pages.
Neyertz et al., Carbon Dioxide Diffusion and Plasticization in Fluorinated Polyimides, Macromolecules, 43(18)7813-7827 (2010).
Ostwal et al., Molecular dynamics simulation of diffusion and sorption of water in conducting polyaniline, J. Chem. Phys., 126 (12):124903 1-7 (2007).
Palchoudhury et al., Synthesis and Growth Mechanism of Iron Oxide Nanowhiskers, Nano Letters, ACS Publications, pp. 1141-1146, vol. 11 (2011).
Pan et al., Water vapor/propylene sorption and diffusion behavior in PVA-P(AA-AMPS) blend membranes by GCMC and MD simulation, Chem. Eng. Sci., 64(24):5192-5197 (2009).
Pandiyan et al., Carbon Dioxide Solubility in Three Fluorinated Polyimides Studied by Molecular Dynamics Simulations, Macromolecules, 43(5):2605-2621 (2010).
Preethi et al., Reversible oxygen-binding and facilitated oxygen transport in membranes of polyvinylimidazole complexed with cobalt-phthalocyanine, React. Funct. Polym., 66:851-855 (2006).
Ribeiro, Molecular dynamics simulation of liquid sulfur dioxide, J. Phys. Chem. B, 110(17):8789-8797 (2006).
Rochelle, Amine Scrubbing for $CO_2$ Capture, Science, 325(5948):1652-1654 (2009).
Sandru et al., High molecular fixed-site-carrier PVAm membrane for $CO_2$ capture, Desalination, 240(1-3):298-300 (2009).
Sedigh et al., Transport and morphological characteristics of polyetherimide-based carbon molecular sieve membranes, Indust. Eng Chem. Res., 38(9):3367-3380 (1999).
Shannon et al., Properties of Alkylimidazoles as Solvents for $CO_2$ Capture and Comparisons to Imidazolium-Based Ionic Liquids, Indust. Eng. Chem. Res., 50(14):8665-8677 (2011).
Simons et al., How do polymerized room-temperature ionic liquid membranes plasticize during high pressure $CO_2$ permeation? J. Membrane Sci., 360(1-2):202-209 (2010).
Skoulidas et al., Rapid transport of gases in carbon nanotubes, Phys. Rev. Lett., 89(18):185901 1-4 (2002).

(56) References Cited

OTHER PUBLICATIONS

Skoulidas et al., Self-diffusion and transport diffusion of light gases in metal-organic framework materials assessed using molecular dynamics simulations, J. Phy. Chem. B, 109(33):15760-15768 (2005).

Smith et al., A comparison of ether-and alkyl-derivatized imidazolium-based room-temperature ionic liquids: a molecular dynamics simulation study, Phys. Chemistry Chem. Phys., 10(41):6301-6312 (2008).

Smith et al., A comparison of fluoroalkyl-derivatized imidazolium:TFSI and alkyl-derivatized imidazolium:TFSI ionic liquids: a molecular dynamics simulation study, Phys. Chemistry Chem. Phys., 12(26):7064-7076 (2010).

Tomizaki et al., Heats of Reaction and Vapor-Liquid Equilibria of Novel Chemical Absorbents for Absorption/Recovery of Pressurized Carbon Dioxide in Integrated Coal Gasification Combined Cycle—Carbon Capture and Storage Process, Indust. Eng. Chem. Res., 49(3):1214-1221 (2010).

Turner et al., Effect of confinement on chemical reaction equilibria: The reactions $2NO <-> (NO)(2)$ and $N-2+3H(2) <-> 2NH(3)$ in carbon micropores, J. Chem. Phys., 114(4):1851-1859 (2001).

\* cited by examiner

IMIDAZOLE-CONTAINING POLYMER MEMBRANES AND METHODS OF USE

CROSS REFERENCE TO RELATED APPLICATIONS

This application claims the benefit of priority to U.S. Provisional Application No. 61/726,718, filed Nov. 15, 2012, which is hereby incorporated by reference herein in its entirety.

FIELD

The subject matter disclosed herein generally relates to imidazole-containing polymer membranes and methods of their preparation. Also, the subject matter described herein generally relates to methods of using the imidazole-containing polymer membranes described herein to capture and reduce volatile compounds from gas streams.

BACKGROUND

Growing concerns over the contributions of billions of tons of annual $CO_2$ emissions from coal-fired power plants and large point sources, as well as other greenhouse gases (GHG), to global climate change have prompted major efforts to curb emissions. A number of diverse technologies, including solvents, membranes, sorbents, and other concepts are currently at various stages of evaluation as potential solutions that can contribute to meeting the challenge of energy efficient carbon capture and storage (CCS). Energy-efficient capture of $CO_2$ is an especially challenging process due to the low concentrations and partial pressures of $CO_2$ typically encountered at power plants and other point sources of $CO_2$ emissions. While membrane-based processes are not as mature as solvent-based technologies for this application, membranes are potentially the most energy efficient option. New membrane materials with unique transport mechanisms are needed to achieve a long-term, energy-efficient technology for capture of $CO_2$ from industrial sources. The compositions and methods disclosed herein address these and other needs.

SUMMARY

In accordance with the purposes of the disclosed materials, compounds, compositions, and methods, as embodied and broadly described herein, the disclosed subject matter, in one aspect, relates to compounds and compositions and methods for preparing and using such compounds and compositions. In a further aspect, the disclosed subject matter relates to membranes that can be used for the capture of volatile compounds in industrial and commercial natural gas production and power generation industries. More specifically, imidazole-containing polymer membranes and methods of their preparation are described herein. Also, the subject matter described herein generally relates to methods of using the imidazole-containing polymer membranes described herein to capture and reduce volatile compounds from gas streams.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF FIGURES

The accompanying Figures, which are incorporated in and constitute a part of this specification, illustrate several aspects described below.

DETAILED DESCRIPTION

Figure 1A:
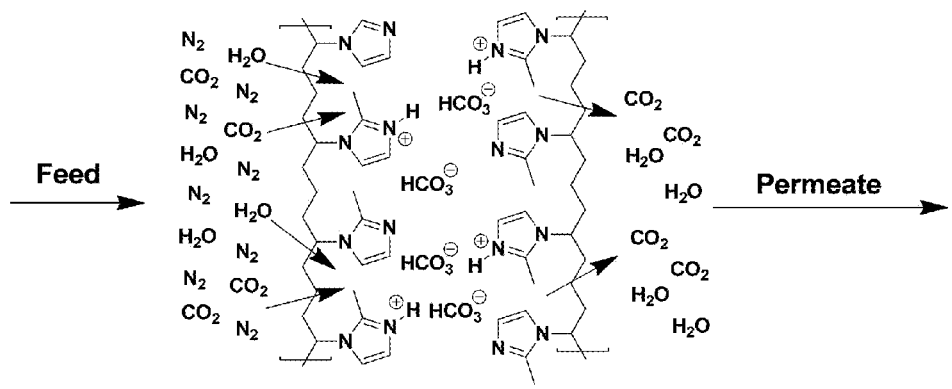
FIG. 1A is a schematic of the facilitated transport of $CO_2$ through an imidazole-containing polymer membrane via a bicarbonate anion.

The materials, compounds, compositions, articles, and methods described herein may be understood more readily by reference to the following detailed description of specific aspects of the disclosed subject matter and the Examples and Figures included therein.

Before the present materials, compounds, compositions, kits, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

A. GENERAL DEFINITIONS

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

By "reduce" or other forms of the word, such as "reducing" or "reduction," is meant lowering of an event or characteristic (e.g., volatile compounds in a stream). It is understood that this is typically in relation to some standard or expected value, in other words it is relative, but that it is not always necessary for the standard or relative value to be referred to. For example, "reduces $CO_2$" means reducing the amount of $CO_2$ in a stream relative to a standard or a control. As used herein, reduce can include complete removal. In the disclosed method, reduction can refer to a 10%, 20%, 30%, 40%, 50%, 60%, 70%, 80%, 90%, or 100% decrease as compared to the standard or a control. It is understood that the terms "sequester," "capture," "remove," and "separate" are used synonymously with the term "reduce."

By "treat" or other forms of the word, such as "treated" or "treatment," is meant to add or mix two or more compounds, compositions, or materials under appropriate conditions to produce a desired product or effect (e.g., to reduce or eliminate a particular characteristic or event such as $CO_2$). The terms "contact" and "react" are used synonymously with the term "treat."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

B. CHEMICAL DEFINITIONS

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)).

The term "anion" is a type of ion and is included within the meaning of the term "ion." An "anion" is any molecule, portion of a molecule (e.g., Zwitterion), cluster of molecules, molecular complex, moiety, or atom that contains a net negative charge.

The term "cation" is a type of ion and is included within the meaning of the term "ion." A "cation" is any molecule, portion of a molecule (e.g., Zwitterion), cluster of molecules, molecular complex, moiety, or atom, that contains a net positive charge.

The term "non-ionic" as used herein refers to being free of ionic groups or groups that are readily substantially ionized in water. A "non-ionic" compound does not contain a charge at neutral pH (e.g., at a pH from 6.7 to 7.3). However, non-ionic compounds can be made to have a charge under acidic or basic conditions or by methods known in the art, e.g., protonation, deprotonation, oxidation, reduction, alkylation, acetylation, esterification, deesterification, hydrolysis, etc. Thus, the disclosed "non-ionic" compounds can become ionic under conditions where an acidic proton is available to protonate the compound.

The term "volatile compound" as used herein refers to chemical compounds that are capable of vaporizing under ambient conditions. The "volatile compounds" described herein are found in the streams and have higher vapor pressures than the stream, such as natural gas feeds. Volatile compounds include light gases and acid gases, such as $CO_2$, $O_2$, $N_2$, $CH_4$, $H_2$, hydrocarbons, $H_2S$, $SO_2$, NO, $NO_2$, COS, $CS_2$, and the like.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —OA$^1$ where A$^1$ is alkyl as defined above.

The term "alkenyl" as used herein is a hydrocarbon group of from 2 to 24 carbon atoms with a structural formula containing at least one carbon-carbon double bond. Asymmetric structures such as (A$^1$A$^2$)C=C(A$^3$A$^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C=O.

The term "amino" as used herein is represented by the formula —NA$^1$A$^2$, where A$^1$ and A$^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" or "carboxyl" group as used herein is represented by the formula —C(O)$^-$.

The term "ester" as used herein is represented by the formula —OC(O)A$^1$ or —C(O)OA$^1$, where A$^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula A$^1$OA$^2$, where A$^1$ and A$^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula A$^1$C(O)A$^2$, where A$^1$ and A$^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "nitro" as used herein is represented by the formula —NO$_2$.

The term "silyl" as used herein is represented by the formula —SiA$^1$A$^2$A$^3$, where A$^1$, A$^2$, and A$^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2$A$^1$, where A$^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "thiol" as used herein is represented by the formula —SH.

The term "thio" as used herein is represented by the formula —S—.

"R$^1$," "R$^2$," "R$^3$," "R$^n$," etc., where n is some integer, as used herein can, independently, possess one or more of the groups listed above. For example, if R$^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

It is to be understood that the compounds provided herein can contain chiral centers. Such chiral centers can be of either the (R-) or (S-) configuration. The compounds provided herein can either be enantiomerically pure, or be diastereomeric or enantiomeric mixtures.

As used herein, substantially pure means sufficiently homogeneous so as to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound may, however, be a mixture of stereoisomers.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

C. MATERIALS AND COMPOSITIONS

Disclosed herein are imidazole-containing polymer membranes and methods of using the polymers as facilitated transport membranes for $CO_2$ capture. Not to be bound by theory, it is likely that the strength of the interactions and rate of $CO_2$ transport as bicarbonate ($HCO_3^-$) anion are primarily influenced by the $pK_a$ of the imidazole group arising from type(s) and number of substituents attached to the imidazole core. Thus, the polymer's physical properties (e.g., $T_g$) can be controlled via selected combinations of substituents attached to the imidazole core and the nature of the polymerizable group.

Polymer Membranes for $CO_2$ Capture

Most polymer membranes operate via the solution-diffusion process, wherein the permeability (P) of the material is a product of the gas solubility (S) and diffusivity (D) (Equation 1) (see Wijmans et al., *J Membrane Sci* 1995, 107(1-2):1-21), with separation of gases achieved via solubility and/or diffusion differences. Permeability is a measure of flux normalized for pressure and thickness with typical units of Barrers. The separation factor for a gas pair ($\alpha_{i,j}$) is defined as the ratio of permeabilities which can be broken down into both solubility and diffusivity contributions.

$$P = S \cdot D \quad (1)$$

$$\alpha_{i,j} = \frac{P_i}{P_j} = \frac{S_i}{S_j} \cdot \frac{D_i}{D_j} \quad (2)$$

To achieve the high throughputs necessary for treating the large volumes of flue gas in post-combustion $CO_2$ capture, very thin membranes (<500 nm) in high surface area modules (i.e., bundles of hollow fibers) are useful. See NETL DOE/NETL Advanced Carbon Dioxide Capture R&D Program: Technology Update May 2011; Merkel et al., *J Membrane Sci* 2010, 359(1-2):126-139. Because $CO_2$ is only present at low partial pressures (about 2 psia), there is very little driving force available to separate $CO_2$. For comparison, membranes are already effectively used commercially within the natural gas industry to separate $CO_2$ from $CH_4$. However, the partial pressure of $CO_2$ in that application is often >>100 psia, making it relatively easy to achieve high $CO_2$ flux and removal from $CH_4$. See Bernardo et al., *Indust Eng Chem Res* 2009, 48(10):4638-4663; Baker, R. W., *Indust Eng Chem Res* 2002, 41(6):1393-1411; Baker et al., *Indust Eng Chem Res* 2008, 47(7):2109-2121. Thus, highly permeable membranes that enable high $CO_2$ fluxes at the minimal driving force available are needed to efficiently capture $CO_2$ from flue gas. Models indicate that membranes with permeances (permeability in Barrers divided by membrane thickness in microns) of >1000 gpu and $CO_2/N_2$ selectivities >50 can present favorable economics for post-combustion $CO_2$ capture (see Merkel et al., *J Membrane Sci* 2010, 359(1-2):126-139).

Two examples of polymer membranes that have shown promise for $CO_2$ capture are poly(ethylene glycol) or PEG-based materials (see Lin et al., *J Mol Struct* 2005, 739(1-3): 57-74; Lin et al., *Macromolecules* 2005, 38(20):8394-8407) and poly(IL)-IL composites (see Bara et al., *Indust Eng Chem Res* 2008, 47(24):9919-9924; Bara et al., *Polym Adv Tech* 2008, 19(10):1415-1420; Bara et al., *Indust Eng Chem Res* 2009, 48(9):4607-4610; Bara et al., *Indust Eng Chem Res* 2009, 48(6):2739-2751; Bara et al., *Acct Chem Res* 2010, 43(1):152-159; Carlisle et al., *J Membrane Sci* 2010, 359(1-2):37-43; Hudiono et al., *J Membrane Sci* 2010, 350(1-2):117-123). PEG membranes are composed of ethylene glycol repeat units that exhibit $CO_2$ permeability of 200-600 Barrers and $CO_2/N_2$ selectivity of about 50, as favored by a large solubility difference between $CO_2$ and $N_2$ (see Lin et al., *J Mol Struct* 2005, 739(1-3):57-74; Lin et al., *Macromolecules* 2005, 38(20):8394-8407). PEG-based membranes are hydrophilic and can be coated onto hollow fibers at thicknesses of <500 nm. PEG-based membranes can be conveniently fabricated from readily available starting materials at low cost. Poly(IL)-IL composites are composed of a positively charged polymer backbone with "free" anions and additional "free" IL cations present between the chains (see Bara et al., *Indust Eng Chem Res* 2008, 47(24):9919-9924; Bara et al., *Polym Adv Tech* 2008, 19(10):1415-1420; Bara et al., *Indust Eng Chem Res* 2009, 48(9):4607-4610; Bara et al., *Indust Eng Chem Res* 2009, 48(6):2739-2751; Bara et al., *Acct Chem Res* 2010, 43(1):152-159). Poly(IL)-IL composites exhibit similar $CO_2$ permeability and selectivity performances to PEG-based materials when the content of "free" IL is high (see Li et al., *Indust Eng Chem Res* 2011, 50(15):9344-9353).

Both PEG and IL materials exhibit transport properties that would be expected of conventional polymers with typical levels of $CO_2$ solubility (about 2 $cm^3$ (STP) $(cm^3$ polymer$)^{-1}$ $atm^{-1}$) and diffusivity ($1\times10^{-7}$-$1\times10^{-6}$ $cm^2$ $s^{-1}$). See Bara et al., *Indust Eng Chem Res* 2007, 46(16):5397-5404; Lin et al., *J Mol Struct* 2005, 739(1-3):57-74; Lin et al., *Macromolecules* 2005, 38(20):8394-8407. The viability of these types of membranes ultimately relies on how thin they can be made. Much greater advances in $CO_2$ permeability and selectivity via increasing $CO_2$ solubility and/or diffusivity cannot be achieved without inclusion of carrier sites for the facilitated transport of $CO_2$.

Figure 2:
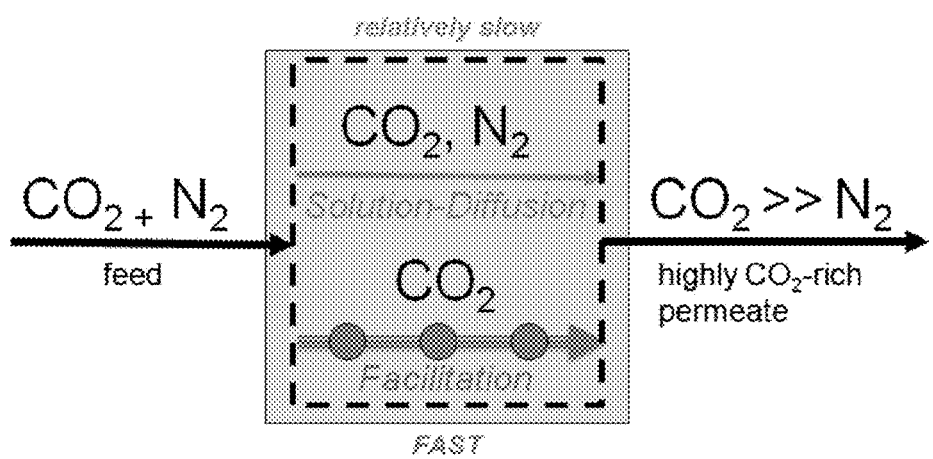
FIG. 2 is an illustration of solution diffusion and facilitated transport mechanisms in a membrane for $CO_2/N_2$ separation.

Facilitated transport relies upon the use of a fixed or mobile carrier site to enhance the solubility and/or diffusivity of the species of interest in the membrane (FIG. 2). For $CO_2$, the most useful carrier sites are amines, as they can react directly with $CO_2$, according to Scheme 1. Primary (1°) and secondary (2°) amines are capable of reacting with $CO_2$, with or without water present. 1° and 2° amines can achieve high levels of $CO_2$ uptake (up to 0.5 mol $CO_2$/mol amine) even at the low partial pressures of $CO_2$ found in flue gas (about 2 psia) (see NETL DOE/NETL Advanced Carbon Dioxide Capture R&D Program: Technology Update May 2011). Inclusion of amines in polymer membranes can theoretically provide up to a 100× increase in $CO_2$ solubility compared to that achieved via physical dissolution when the solution-diffusion mechanism is relied upon (see Camper et al., *Indust Eng Chem Res* 2008, 47 (21): 8496-8498). However, $CO_2$-amine reactions are typically not readily reversible at low to moderate temperatures, due to the inherent stability of the carbamate (see Astarita et al., *Gas Treating with Chemical Solvents*. John Wiley & Sons: New York, 1983; Kidnay, A. J.; Parrish, W. R., *Fundamentals of Natural Gas Processing*. CRC Press: Taylor & Francis Group: Boca Raton, Fla., 2006). Thus, polymer membranes with amines will absorb significant amounts of $CO_2$, but will not provide high rates of transport at the temperature of the flue gas feed (40-60° C.). At temperatures where the carbamate is reversible (>100° C.), diffusion of other gases (e.g., $N_2$) becomes much more rapid as the polymer becomes more rubbery, negating any effect of facilitated transport of $CO_2$.

Scheme 1: Reaction between $CO_2$ and 2 moles of amine to form carbamate-ammonium salt

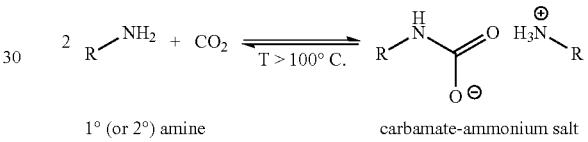

1° (or 2°) amine        carbamate-ammonium salt

An alternative mechanism for increasing $CO_2$ solubility in polymer membranes is through the use of tertiary (3°) amines or other bases that are not capable of forming carbamates but instead promote formation of bicarbonate ($HCO_3^-$) anion (see Id.). $CO_2$ and water combine to form carbonic acid ($H_2CO_3$, $1^{st}$ $pK_a$=6.35), which is neutralized to $HCO_3^-$ salts in the presence of a relatively weak base, as shown in Scheme 2. The reaction can be readily reversed at low to moderate temperatures and/or with mild vacuum conditions (see Tomizaki et al., *Indust Eng Chem Res* 2009, 49(3):1214-1221). This facilitated transport mechanism is thus far more favorable for energy efficient $CO_2$ capture under post-combustion conditions (see NETL DOE/NETL Advanced Carbon Dioxide Capture R&D Program: Technology Update May 2011). However, it has yet to be examined under low $CO_2$ partial pressures, as there is a lack of polymer materials (or polymerizable monomers) containing only 3° amines or other basic groups in the appropriate $pK_a$ range (about 7.0-9.5) to be useful for $CO_2$ transport as $HCO_3^-$.

Scheme 2: Reaction between $CO_2$ and water to form carbonic acid, with subsequent neutralization to form bicarbonate-ammonium salt

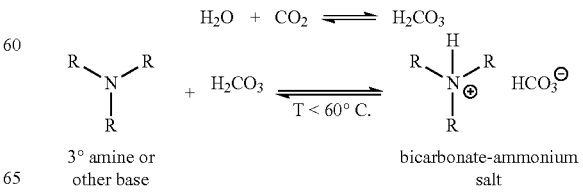

3° amine or        bicarbonate-ammonium
other base        salt

Facilitated transport via the bicarbonate mechanism in Scheme 1 has been shown to be possible in applications with higher partial pressures of $CO_2$ (>2 atm) such as pre-combustion $CO_2$ capture and natural gas sweetening. However, the materials developed are far from ideal for low-pressure application. Hydrophilic membranes based on poly(vinyl amine)-poly(vinyl alcohol) (PVAm-PVA) copolymers with 1° amine groups promote facilitated transport of $CO_2$ as bicarbonate but only after the amine sites have been saturated as carbamates (Scheme 1), using the carbamate anion (Scheme 1) as the base in Scheme 2. These materials have been demonstrated to successfully exhibit facilitated transport of $CO_2$ under clean conditions (i.e., only $CO_2$, $N_2$ and $H_2O$). See Grainger et al., Fuel 2008, 8(1):14-24; Deng et al., J Membrane Sci 2009, 34(1-2):154-163; Sandra et al., Desalination 2009, 240(1-3): 298-300. However, many amines are easily and irreversibly degraded by oxidizers such as $O_2$, $SO_2$ and $NO_x$, which will limit the applicable lifetimes of the amine-based carrier causing membrane performance to rapidly diminish in flue gas from a coal-fired power plant (see NETL DOE/NETL Advanced Carbon Dioxide Capture R&D Program: Technology Update May 2011). Thus, the PVAm-PVA approach is not applicable to low pressure $CO_2$ capture. At low pressures, 1° amines will not promote facilitated transport (i.e., only Scheme 1 will occur and will be largely irreversible) (see Astarita et al., Gas Treating with Chemical Solvents. John Wiley & Sons: New York, 1983; Kidnay, A. J.; Parrish, W. R., Fundamentals of Natural Gas Processing. CRC Press: Taylor & Francis Group: Boca Raton, Fla., 2006). Thus, in order to utilize facilitated transport membranes as a highly energy efficient mechanism to capture $CO_2$ from low pressure streams, stable carriers in the appropriate $pK_a$ range are described and incorporated into polymers herein.

Imidazoles for $CO_2$ Capture $CO_2$ solubility in a series of 1-n-alkylimidazole compounds (e.g., 1-methylimidazole, 1-butylimidazole, etc.) was explored. It was determined that in an anhydrous environment, imidazoles act as physical (non-reactive) solvents for $CO_2$ (see Shannon et al., Indust Eng Chem Res 2011, 50(14): 8665-8677). Solubility of $CO_2$ in 1-n-alkylimidazoles was comparable to other organic solvents and ILs, but was only a fraction of the capacity exhibited by aqueous amine solvents. However, in the presence of a 1° or 2° amine, 1-n-alkylimidazoles were capable of acting as proton ($H^+$) acceptors, forming carbamate-imidazolium salts (similar to Scheme 1). Additionally, it has been shown that 1-methylimidazole and 1,2-dimethylimidazole form bicarbonate-imidazolium salts with $CO_2$ in aqueous solutions (Scheme 3) (see Tomizaki et al., Indust Eng Chem Res 2009, 49(3):1214-1221). The reported data indicate that at 40° C. and a $CO_2$ partial pressure of 2 psia, a 3 M aqueous solution of 1,2-dimethylimidazole ($pK_a$=8.21) will have a loading of at least 0.30 mol $CO_2$/mol imidazole, due to a highly non-linear relationship between loading and pressure. The data also reveal that by applying vacuum or mildly heating to just 70° C., virtually all of the $CO_2$ can be desorbed from solution. As the reported data indicate the heat of reaction is about 55 kJ/mol $CO_2$, the bicarbonate formation can be readily reversed with minimal energy requirements. For reference, the reaction of $CO_2$ with monoethanolamine (MEA), which would be largely irreversible under these temperature and pressure conditions, has a heat of reaction of about 85 kJ/mol $CO_2$.

Scheme 3: Neutralization of carbonic acid by 1,2-dimethylimidazole to form bicarbonate-imidazolium salt

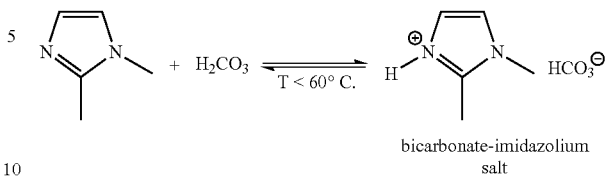

bicarbonate-imidazolium salt

The equilibrium of the reaction in Scheme 3 can be shifted to favor products or reactants through the use of imidazoles with varying substitution patterns (see Lenarcik et al., J Heterocyclic Chem 2002, 39(2):287-290). For example at 40° C. and 2 psia, 1-methylimidazole ($pK_a$=7.21) would exhibit lower loading (about 0.15 mol $CO_2$/mol) but with a lower heat of reaction (about 45 kJ/mol $CO_2$), while 1,2,4-trimethylimidazole ($pK_a$=8.64) and 1,2,4,5-tetramethylimidazole ($pK_a$=9.20) would be expected to be >>0.40 mol $CO_2$/mol, but with increased heat of reaction (>65 kJ/mol). Thus, the $pK_a$ of the imidazole will influence the extent and heat of reaction of the bicarbonate formation, which in turn will govern the rate of $CO_2$ transport. The overall reaction equilibrium (including electrostatic effects, confinement, steric exclusion, etc.) of these events can be directly captured with Reactive Monte Carlo simulations.

Developing facilitated transport membranes around this chemistry is accomplished by synthesizing imidazole-based monomers that are polymerized (or co-polymerized with other monomers) to form stable polymer films that include these carrier sites. Table 1 summarizes the properties of PEG and poly(IL)-IL membranes and the potential performances of imidazole-containing polymers described herein that utilize facilitated transport mechanisms.

TABLE 1

Properties of polymer membranes for $CO_2$ capture applications

| Polymer Membrane | Transport Mechanism | $CO_2$ Perm. (Barrers) | $CO_2/N_2$ Selectivity |
|---|---|---|---|
| PEG (polyethylene glycol)) | Solution - Diffusion | 200-600 | 50+ |
| poly(IL)-IL composites | Solution - Diffusion | 50-200 | 20-40 |
| Imidazole-based membranes | Fac. Trans. | 4000-10000 | >>50 |

Imidazole-Based Polymers as Advanced Membranes for $CO_2$ Capture

Imidazole-based monomers as described herein are useful for preparing high-flux, high-selectivity facilitated transport membranes for $CO_2$, as they exhibit $pK_a$ values of 7-9.5 and are both thermally stable and chemically resistant to oxidation by $O_2$, $SO_2$ and $NO_x$. Recent work has shown that imidazole monomers with styrene functionality can be conveniently synthesized from readily available starting materials (see Anderson et al., Polymer 2010, 51(12):2447-2454; Green et al., Euro Polymer J 2011, 47(4):486-496). These monomers have been successfully synthesized and polymerized to form homopolymers with a variety of pendant imidazole structures as described herein, as well as co-polymers with PEG-based and poly(IL) groups.

Based on the available equilibrium data for $CO_2$ absorption in aqueous imidazole solutions, very high capacities of $CO_2$ are achieved for imidazole-containing polymer membranes relative to conventional polymers, such as PEG. For a homopolymer based on the imidazole monomers with styrene functionality (MW=198.21) with an assumed density of 1.00 g/cm$^3$, the concentration of imidazole sites available for reaction to form bicarbonate is slightly >5 mol/1000 cm$^3$ of polymer. This translates to a maximum CO$_2$ capacity of 220 g CO$_2$ (1000 cm$^3$ polymer)$^{-1}$ or 112 cm$^3$ CO$_2$ (STP) (cm$^3$ polymer)$^{-1}$. Based on the aforementioned data for 1,2-dimethylimidazole, only about 30% of these sites are saturated at a CO$_2$ partial pressure of 2 psia (0.136 atm) at 40° C. in the presence of water. Under these conditions, the membrane still has a remarkable effective capacity for CO$_2$ of 35 cm$^3$ CO$_2$ (STP) (cm$^3$ polymer)$^{-1}$. By comparison, a conventional polymer membrane material, such as PEG, can exhibit an actual capacity for CO$_2$ of 0.272 cm$^3$ CO$_2$ (STP) (cm$^3$ polymer)$^{-1}$ under the same conditions (see Lin et al., *J Mol Struct* 2005, 739(1-3):57-74; Lin et al., *Macromolecules* 2005, 38(20): 8394-8407), giving the imidazole-containing polymer >100× advantage in CO$_2$ solubility. Diluting the concentration of the imidazole groups by a factor of 5 through co-polymerization with a PEG-based (or other) monomer still provides a >20× advantage in CO$_2$ solubility. This increased CO$_2$ solubility results in a corresponding 20× increase in membrane permeability. As PEG already has a permeability of 200-600 Barrers (see Lin et al., *J Mol Struct* 2005, 739(1-3):57-74; Lin et al., *Macromolecules* 2005, 38(20):8394-8407; An et al., *J Phys Chem Lett* 2010, 1(15):2269-2273), addition of imidazole carrier sites can increase the permeability to 4000-10000 Barrers with a selectivity for CO$_2$/N$_2$ of at least 50 as the bicarbonate mechanism is only available for CO$_2$ (i.e., N$_2$ transport only via solution-diffusion). Permeabilities and selectivities of this magnitude only require a membrane thickness of 1 μm to achieve 4000 gpu permeance, which reduces the cost of capturing CO$_2$ from post-combustion sources to <$20/ton (see Merkel et al., *J Membrane Sci* 2010, 359(1-2): 126-139), and results in much more rapid deployment and implementation of CO$_2$ capture processes (see NETL DOE/NETL Advanced Carbon Dioxide Capture R&D Program: Technology Update May 2011).

Furthermore, the imidazole-containing polymer members disclosed herein can be used to achieve selective separation of CO$_2$ from other gases relevant to CO$_2$ capture processes, such as sulfur dioxide (SO$_2$) via neutralization of "sulfurous acid" (H$_2$SO$_3$) (1$^{st}$ pK$_a$=1.89, 2$^{nd}$ pK$_a$=7.25) to the imidazolium bisulfite (Scheme 4a) or Lewis Acid-Lewis Bases interaction (Scheme 4b).

Scheme 4: Reaction of SO$_2$ with imidazoles via (a) sulfurous acid and (b) Lewis acid-Lewis base.

(a)

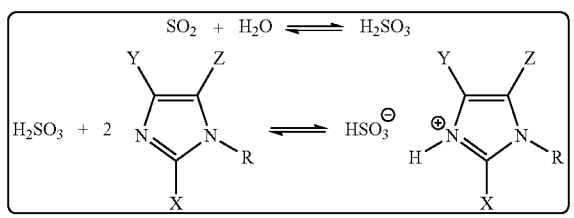

(b)

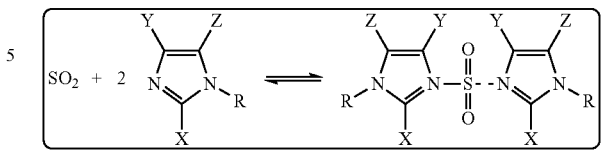

Imidazoles can also react directly with hydrogen sulfide (H$_2$S) (1$^{st}$ pK$_a$=7.05) to form the imidazolium bisulfide salt (Scheme 5).

Scheme 5: Reaction of H$_2$S with imidazoles

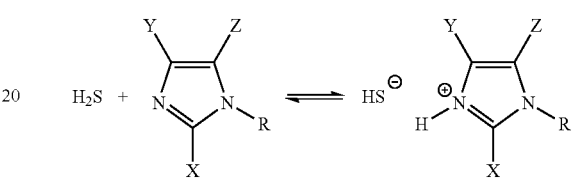

Figure 3:
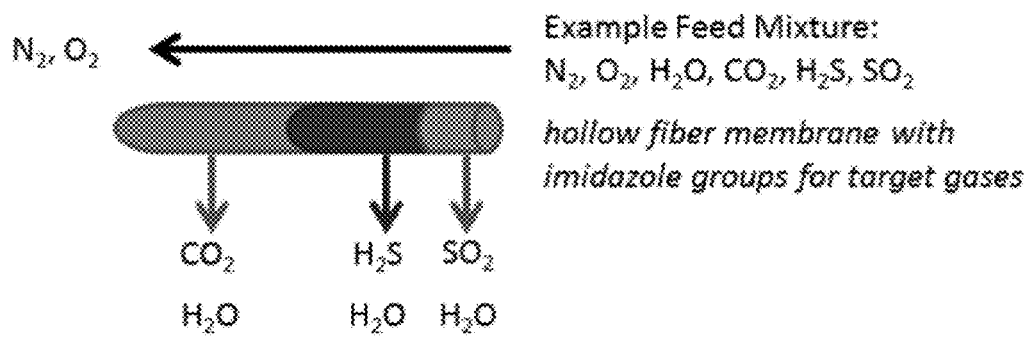
FIG. 3 is a schematic of a hollow fiber polymer membrane with examples of targeted separation capabilities by inclusion of tailored imidazole groups.

Depending on the target gas species, the imidazole group can also be made less basic (i.e., lower pK$_a$) by substitution with electron donating groups such as —Cl, —NO$_2$, etc. so as to develop tailored facilitated transport membranes for each separation application. This tunable reactivity enables the unique design of membranes for the staged removal of target gases. Advanced processing techniques can create multifunctional hollow fiber membranes with imidazoles rationally selected to remove specific gases at various points along the length of the membrane based on the reactivity and concentration of the gases in the stream (FIG. 3). The inherent versatility of the imidazole platform for addressing multiple concerns in CO$_2$ capture processes provides engineering benefits that are not available through conventional processes or other emerging technologies.

Imidazole Monomers

The polymer membranes described herein are prepared from imidazole-based monomers with systematically varied "X", "Y", and/or "Z" functionalities. These monomers are used to fabricate thin films of the homopolymer as well as blends with other polymers through techniques such as, for example, photopolymerization. Imidazole-based materials offer the potential to achieve highly energy efficient CO$_2$ capture using polymer membranes. Through a unique mechanism, polymers containing imidazole sites promote the facilitated transport of CO$_2$ as bicarbonate anion (HCO$_3^-$), maximizing CO$_2$ flux and selectivity, with minimal energy requirements.

Imidazoles can be used as starting materials for ionic liquids (ILs) and poly(ILs), which have shown promise as next-generation membrane materials for CO$_2$ capture due to their tunable structures, which enable control over membrane properties/performance. Like ILs, and all other modifiable cores, imidazoles offer the same advantages with respect to structure-performance tuning, but with the distinguishing feature of a Bronsted basic "pyridine-like" nitrogen (opposite the functionalized or "pyrrole-like" nitrogen), which can act as a H$^+$ acceptor or nucleophile. This reactive center of the imidazole-containing polymers allows the polymers to be used as a membrane for separations involving reversible chemical reactions for CO$_2$ capture. By tuning the nature of the imidazole group, the energy requirements for CO$_2$ transport can be minimized through maximizing $CO_2$ flux. High flux and selectivity with minimal energy requirements are achievable with imidazoles, as the nature of the interaction between $CO_2$ and the imidazole site is weaker than the traditional amine-based carriers that have been previously employed. The mechanism is effective with only a minimal pressure gradient, as the interactions between the imidazole and $CO_2$ give the materials an inherently high capacity for $CO_2$, but are not too strong by which the $CO_2$ remains fixed to the carrier site. Furthermore, unlike amine-based carriers, the imidazole site is stable to $O_2$, $SO_2$, and other detrimentally reactive gases present alongside $CO_2$ in flue gas.

The imidazole monomers described herein are represented by Formula I:

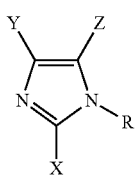

(I)

and derivatives thereof.

In Formula I, R is a polymerizable group. As used herein, a "polymerizable group" refers to portions of polymerizable compounds that are able to propagate via free-radical polymerization, such as carbon-carbon double bonds. Examples of suitable R groups include vinyl-containing groups, acrylate-containing groups, and methacrylate-containing groups. In some examples, R includes substituted or unsubstituted styrene. Optionally, the substituted styrene can be α-methyl-styrene. Further examples of polymerizable groups can be those groups that are able to propagate via condensation polymerization, such as amines and alcohols with isocyantes, or alcohols with esters or lactones.

Also in Formula I, X, Y, and Z are each independently selected from the group consisting of hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, cyano, nitro, and $CO_2CH_3$. In certain examples, X, Y, and Z are not all hydrogen.

In some examples, X, Y, and/or Z can be electron withdrawing groups or electron donating groups. Examples of electron withdrawing groups include halo (e.g., F, Cl, Br), nitro, cyano, or $CO_2CH_3$ groups. Examples of electron donating groups include alkyl groups (e.g., $C_{1-6}$ alkyl groups, such as methyl, ethyl, propyl, isopropyl, butyl, pentyl or hexyl) and amino groups.

Further in Formula I, Y and Z can be combined to form a substituted or unsubstituted aryl, substituted or unsubstituted heteroaryl, substituted or unsubstituted cycloalkyl, substituted or unsubstituted cycloalkenyl, substituted or unsubstituted cycloalkynyl, substituted or unsubstituted heterocycloalkyl, substituted or unsubstituted heterocycloalkenyl, or substituted or unsubstituted heterocycloalkynyl.

In some embodiments, the polymerizable group (i.e., R) of the imidazole monomers represented by Formula I can be selected from styrene, vinyl, or (meth)acrylate. In some examples of Formula I, R can be styrene as represented by Formula I-A. In other examples of Formula I, R can be vinyl as represented by Formula I-B. In still further examples of Formula I, R can be an acrylate group as represented by Formula I-C. In still further examples of Formula I, R can be a methacrylate group as represented by Formula I-D. In still further examples of Formula I, R can be an acrylonitrile group as represented by Formula I-E.

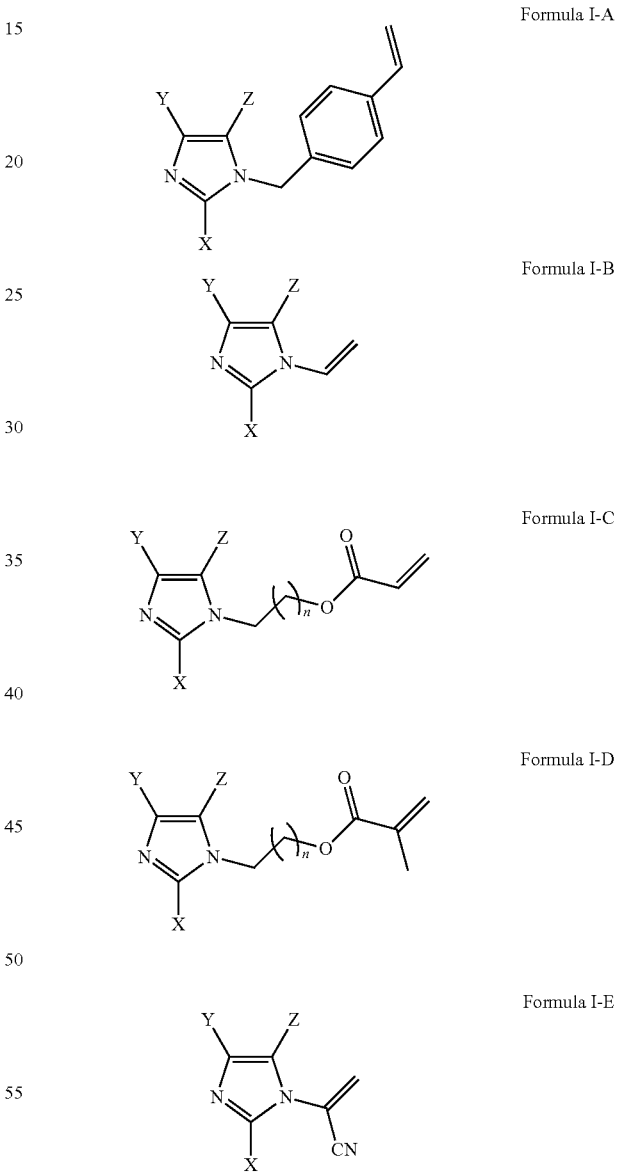

In Formula I-C and Formula I-D, n is an integer from 0 to 10. In some embodiments, X, Y, and Z in Formula I-A-I-E are each hydrogen.

In some embodiments, the imidazole substituents X, Y, and/or Z can be electron donating groups. For example, the imidazole monomers can be represented by the following structures:

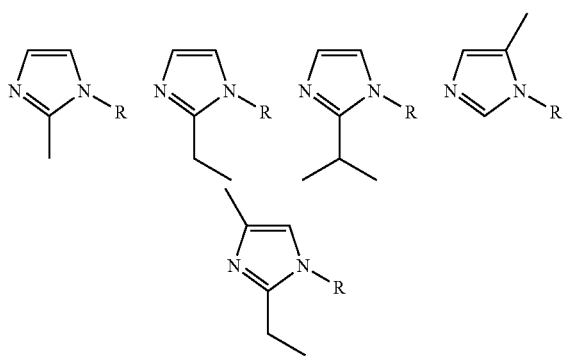

where R is a polymerizable group as defined herein, especially those shown in Formula I-A-I-E.

In some embodiments, the imidazole substituents X, Y, and/or Z can be electron withdrawing groups. For example, the imidazole monomers can be represented by the following structures:

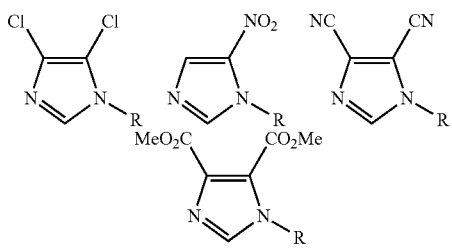

where R is a polymerizable group as defined herein, especially those shown in Formula I-A-I-E.

In some embodiments, the imidazole substituents Y and Z can combine to form a substituted or unsubstituted aryl resulting in a benzimidazole group. The benzimidazole can be represented by Formula I-F.

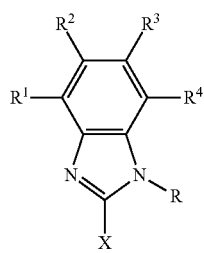

In Formula I-F, $R^1$, $R^2$, $R^3$, and $R^4$ can be independently selected from the group consisting of hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted thio, substituted or unsubstituted alkoxyl, substituted or unsubstituted aryloxyl, substituted or unsubstituted amino, cyano, nitro, and $CO_2CH_3$.

Optionally, $R^1$, $R^2$, $R^3$, and $R^4$ in Formula I-F are selected from an electron donating group or an electron withdrawing group. For example, Formula I-F can be represented by the following structures:

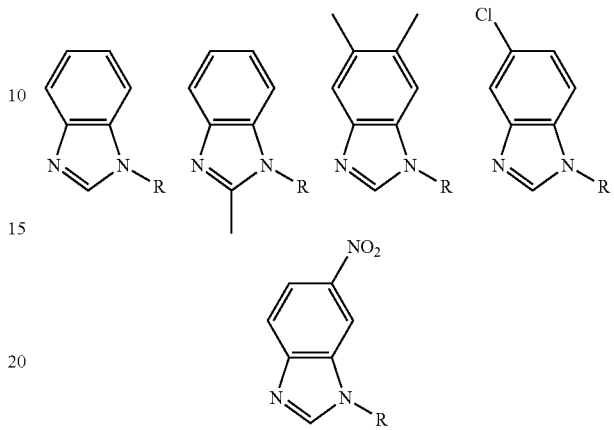

where R is a polymerizable group as defined herein, especially those shown in Formula I-A-I-E.

Imidazole-Containing Polymers

The imidazole monomers described herein can be used to prepare the imidazole-containing polymers. In some embodiments, the imidazole-containing polymer is a homopolymer (i.e., the polymer is prepared by polymerizing a single selected monomer). In some embodiments, the imidazole-containing polymer is a co-polymer (i.e., the polymer is prepared by polymerizing two or more different monomers). Optionally, the two or more monomers used to prepare the co-polymer include at least one imidazole monomer as described herein. These can be polymerized with divinylbenzene, styrene, acrylate, methacrylate, methylmethacrylate, acrylonitrile, and the like. Optionally, the two or more monomers used to prepare the co-polymer include at least one imidazole monomer as described herein and at least one non-imidazole monomer. For example, the at least one non-imidazole monomer can be styrene, an acrylate monomer, a methacrylate monomer, a vinyl monomer, a poly(ethyleneglycol)-based monomer, or an ionic liquid based monomer.

D. PREPARATION OF THE IMIDAZOLE MONOMERS

The imidazole monomers according to Formula I can be prepared in a variety of ways known to one skilled in the art of organic synthesis or variations thereon as appreciated by those skilled in the art. The compounds described herein can be prepared from readily available starting materials. Optimum reaction conditions can vary with the particular reactants or solvents used, but such conditions can be determined by one skilled in the art. The use of protection and deprotection, and the selection of appropriate protecting groups can be determined by one skilled in the art. The chemistry of protecting groups can be found, for example, in Wuts and Greene, Protective Groups in Organic Synthesis, 4th Ed., Wiley & Sons, 2006, which is incorporated herein by reference in its entirety.

Variations on Formula I include the addition, subtraction, or movement of the various constituents as described for each compound. Similarly, when one or more chiral centers are present in a molecule, the chirality of the molecule can be changed. Additionally, compound synthesis can involve the protection and deprotection of various chemical groups.

The imidazole monomers or the starting materials and reagents used in preparing the disclosed compounds are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), Pfizer (New York, N.Y.), GlaxoSmithKline (Raleigh, N.C.), Merck (Whitehouse Station, N.J.), Johnson & Johnson (New Brunswick, N.J.), Aventis (Bridgewater, N.J.), AstraZeneca (Wilmington, Del.), Novartis (Basel, Switzerland), Wyeth (Madison, N.J.), Bristol-Myers-Squibb (New York, N.Y.), Roche (Basel, Switzerland), Lilly (Indianapolis, Ind.), Abbott (Abbott Park, Ill.), Schering Plough (Kenilworth, N.J.), or Boehringer Ingelheim (Ingelheim, Germany), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Reactions to produce the compounds described herein can be carried out in solvents, which can be selected by one of skill in the art of organic synthesis. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (e.g., $^1$H or $^{13}$C) infrared spectroscopy, spectrophotometry (e.g., UV-visible), or mass spectrometry, or by chromatography such as high performance liquid chromatography (HPLC) or thin layer chromatography.

As shown in Scheme 6, the imidazole monomers described by Formula I can be made, for example, by treating commercially available imidazole (1) with a base (e.g., sodium bicarbonate) to form the imidazolate sodium salt (2). The imidazolate sodium salt (2) can then be treated with a halide (e.g., vinylbenzylchloride) to form the N-substituted imidazole (3).

Scheme 6:

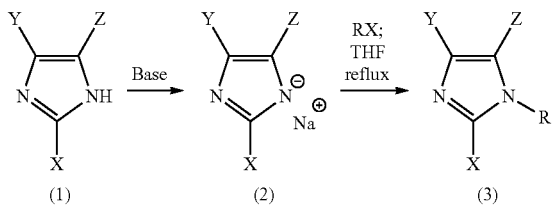

E. PREPARATION OF THE IMIDAZOLE-CONTAINING POLYMERS

The imidazole-containing polymers can be prepared by polymerizing the imidazole monomers using, for example, photopolymerization. The monomers can be photopolymerized neat or dissolved in a suitable solvent. In some examples, the photopolymerization process is substantially free of solvent. By "substantially free" is meant less than 5, 4, 3, 2, or 1 wt. % of the composition.

The monomers can be photopolymerized by irradiating the composition with UV-light (e.g., UVA at 320 to 390 nm or UVV at 395 to 445 nm), visible light, infrared radiation, X-rays, gamma rays, microwaves, or electron beam radiation. The radiation can be monochromatic or polychromatic, coherent or incoherent, and sufficiently intense to generate substantial numbers of free radicals in the photopolymerizable compositions. Suitable sources of such radiation include the sun, tungsten lamps, halogen lamps, fluorescent lamps, lasers, xenon lamps, carbon arcs, electron accelerators, cobalt 60, and mercury vapor discharge lamps.

Optionally, a photoinitiator can be used. Suitable examples of photoinitiators include benzophenones, acetophenone derivatives such as α-hydroxyalkylphenylketones, benzoin ethers, acylphosphonate derivatives, benzoin alkyl ethers and benzyl ketals, monoacylphosphine oxides, and bisacylphosphine oxides. Other examples of photoinitiators that can be used are ethyl 2,4,6-trimethylbenzoylphenyl phosphinate, 2 hydroxy-2-methyl-1-phenyl-propan-1-one, 2,2-dimethoxy-2-phenylacetophenone, hydroxycyclohexylphenylketone, dimethoxylphenylacetophenone, mercaptobenzothiazoles, mercaptobenzooxazoles, hydroxy ketones, phenylglyoxylates, aminoketones, metallocenes, iodonium salts and hexaryl bisimidazole, which are all commercially available or synthesizable by methods known in the art. Additional photoinitiators are disclosed in U.S. Pat. Nos. 5,472,992 and 5,218,009, which are incorporated by reference herein for their teachings of photoinitiators. In a preferred embodiment, the photoinitiator is IRGACURE 1700™, DAROCUR 4265™, IRGACURE 819™, IRGACURE 819DW™, IRGACURE 2022™ or IRGACURE 2100™ or 2,2-dimethoxy-2-phenylacetophenone, which is commercially available from Ciba Additives. The photoinitiator can usually be used in an amount of less than about 10, 9, 8, 7, 6, 5, 4, 3, 2, or 1 wt. % of the monomers. However, higher amounts, such as greater than about 10 wt. % of photoinitiator can be used.

The monomer composition for photopolymerization can comprise additional components such as viscosity modifiers, surfactants, stabilizers, pigments, dyes, plasticizers, fillers, thermally stable inorganic materials, crosslinking agents, and the like. Suitable crosslinking agents can be found in U.S. Pat. No. 7,767,728, which is incorporated by reference herein for its teachings of crosslinking agents.

In one example, a reactive diluent can be present in the monomer compositions. A reactive diluent can be used to adjust the viscosity of the monomer composition and can be a low viscosity monomer capable of photopolymerization. Reactive diluents have a molecular weight of less than about 550 g/mol and can be used in the monomer composition in an amount of less than about 30, 25, 20, 15, 10, 5, or 1 wt. % of the monomer composition. Suitable reactive diluents can be found in U.S. Pat. Nos. 7,521,015 and 6,489,376, which are incorporated by reference herein for their teachings of reactive diluents.

Stabilizers can also be used. Examples of suitable stabilizers are non-acidic nitroso compounds, particularly N-nitrosohydroxylarylamines and derivatives thereof. Alternatively, the stabilizer can be an alkenyl substituted phenolic compound and one or more compounds selected from the consisting of a free radical scavenger, a hindered phenolic antioxidant and a hydroxylamine derivative. Examples of suitable alkenyl substituted phenolic compounds include 2-propenylphenol, 4-acetoxy styrene, 2 allylphenol, isoeugenol, 2-ethoxy-5-propenylphenol, 2-allyl-4-methyl-6-t-butylphenol, 2-propenyl-4-methyl-6-t-butylphenol, 2-allyl-4,6-di-t-butylphenol, 2-propenyl-4,6-di-t-butylphenol and 2,2'-diallyl-bisphenol A. A radical scavenger such as p-methoxy phenol (MEHQ) and a hindered phenolic antioxidant such as butylated hydroxy toluene (BHT) can be used as well.

The imidazole moiety of the imidazole-containing polymer is capable of reacting with and transporting species such as $CO_2$ and $H_2S$ via solution-diffusion (i.e., non-reactive) or facilitated transport (i.e., reactive) mechanisms. Providing imidazole monomers used to prepare the imidazole-containing polymers depends, in one aspect, on the desired properties of the resulting polymer membrane. As described herein, the disclosed compositions can have multiple desired properties (e.g., low viscosity, low volatility, high $CO_2$ capacity, etc.), which, at least in part, come from the properties of the imidazoles used to prepare the polymer membranes. Thus, to prepare the disclosed systems, one or more N-functionalized imidazoles with desired properties and, optionally, one or more additional monomers with desired properties are selected and provided. Properties desired to be adjusted based on the selection of the imidazole can include, for example, polymer physical properties (e.g., $T_g$), membrane transport properties (e.g., permeability of $CO_2$, $H_2O$, $N_2$, etc. and $CO_2$ selectivity), and chemical properties (e.g., $pK_a$ of imidazole group in polymer, hydrophilicity, swelling).

Figure 1B:
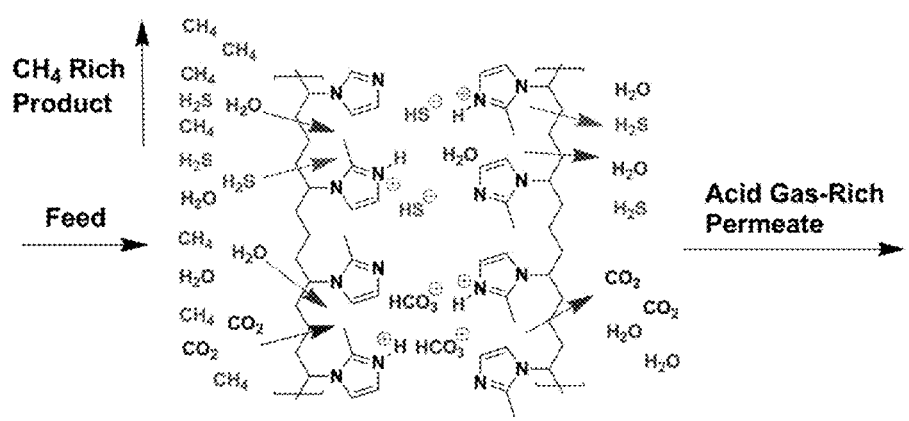
FIG. 1B is a schematic of the simultaneous removal of $CO_2$ and $H_2S$ by reactive mechanisms with an imidazole-containing polymer membrane.

FIG. 1 shows a general depiction of membrane operation for (a) $CO_2$ capture and (b) natural gas treating. As shown in FIG. 1, the membrane achieves transport via $H^+$ hopping and reversible binding to the imidazole groups. As the acid-based interactions are governed by $pK_a$, this platform can create chemical reactivity gradients within the membrane and thus create a tunable, stable carrier for a number of species of interest. For example, polymer membranes prepared from imidazoles substituted with electron donating groups can be used to prepare imidazoles with $pK_a$ values of about 7 to about 9.5. Thus, polymer membranes containing such imidazoles are capable of the facilitated transport of $CO_2$ as bicarbonate anion based on the $1^{st}$ $pK_a$ of $H_2CO_3$ (6.35). Depending on the target gas species, the imidazole group can also be made less basic (i.e., to have a lower $pK_a$) by using imidazoles substituted with electron withdrawing groups. Optionally, the polymer membranes can include a combination of imidazoles substituted with electron withdrawing groups along with imidazoles substituted with electron donating groups to further tailor the membranes for each separation application. Optionally, the polymer membranes can further include one or more metal cations. The metal cations can coordinate to the imidazoles as described herein within the polymer membrane. Examples of suitable metal cations include $Zn^{2+}$ and $Ca^{2+}$.

The imidazole-containing polymers disclosed herein can have a permeance of greater than about 1000 gpu, for example, greater than about 1200 gpu, 1500 gpu, or 2000 gpu. Further the imidazole containing polymers disclosed herein can have a $CO_2/N_2$ selectivity of greater than about 50, for example greater than about 100 or about 200. Still further, the disclosed imidazole containing polymers can be formed into a thin film, with a thickness of from about 500 nm to about 1 µm, from about 1 to about 5 µm or even greater than 5 µm.

It is also desirable in certain instances to protonate or partially protonate the imidazole groups in the imidazole-containing polymer. While not wishing to be bound by theory it is believed that protonation helps the membrane absorb water, which helps drive the formation of carbonic acid and thus bicarbonate anion. This can be especially helpful when the gas stream is flue gas, which usually contains little moisture and when the polymer backbone is hydrophobic. Thus, treating the imidazole-containing polymer with acid (e.g., aqueous acids) to protonate at least some of imidazole groups in the polymer can be beneficial.

F. METHODS OF USING THE SYSTEMS

The systems described herein can be used to reduce volatile compounds from streams (e.g., gas streams) as described in U.S. Published Patent Application Number 2009/0291874, which is incorporated by reference herein for its methods and techniques of volatile compound reduction. As used herein, volatile compounds can include to undesirable gaseous components found in a source and having a molecular weight lower than 150 g/mol. For example, the volatile compounds can have a molecular weight lower than 140 g/mol, 130 g/mol, 120 g/mol, 110 g/mol, 100 g/mol, 90 g/mol, 80 g/mol, 70 g/mol, 60 g/mol, 50 g/mol, 40 g/mol, 30 g/mol, 20 g/mol, or the like, where any of the stated values can form an upper or lower endpoint of a range. Examples of volatile compounds include $CO_2$, CO, COS, $H_2S$, $SO_2$, NO, $N_2O$, mercaptans, $H_2O$, $O_2$, $H_2$, $N_2$, $C_1$-$C_8$ hydrocarbons (e.g., methane and propane), volatile organic compounds, and mixtures of these.

The method for reducing a volatile compound from a stream can include feeding the stream through an imidazole-containing polymer membrane as described herein. For example, volatile compounds from a gas stream (e.g., a natural gas stream or a flue gas stream) can be reduced according to this method. Optionally, $CO_2$ can be captured according to this method. In some embodiments, the polymer membrane is comprised primarily of imidazoles substituted with electron donating groups. In other embodiments, the polymer membrane is composed primarily of imidazoles substituted with electron withdrawing groups.

Further described herein is a method for sweetening a natural gas feed stream. The method includes feeding the natural gas feed stream through an imidazole-containing polymer membrane as described herein.

Further described herein is a method of removing $CO_2$ from a flue gas, or post combustion gas, where the partial pressures of $CO_2$ are low, e.g., less than about 500 psia, 100 psia, 50 psia, or about 2 psia.

In another aspect, disclosed is a method of purifying a gas stream by contacting the stream with two or more imidazole-containing polymer, where each polymer is made from a different imidazole monomer having Formula I.

The examples below are intended to further illustrate certain aspects of the methods and compositions described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Baseline Property Data for Imidazoles and Imidazole-Containing Polymers

Despite their use in pharmaceutical and biological applications and the ubiquity of 1-methylimidazole as a precursor for imidazolium-based ILs, only a handful of physical property data exist for even the simplest N-functionalized imidazoles (see Shannon et al., *Indust Eng Chem Res* 2011, 50(14): 8665-8677; Emel'yanenko et al., *J Chem Thermodyn* 2011, 43(10):1500-1505; Verevkin et al., *J Phys Chem B* 2011, 115(15):4404-4411). Furthermore, work to date has only focused on the liquid state of these materials. Other than for poly(vinylimidazole), which has been primarily examined for its chelation properties, little effort has been given to design imidazole-based monomers and tailored polymers (see Anderson et al., *Polymer* 2010, 51(12): 2447-2454; Green et al., *Europ Polymer J* 2011, 47(4):486-496). N-vinylimidazole, while a polymerizable imidazole, only offers limited potential, as it has been reported to exhibit slow polymerization kinetics and does not offer a convenient means by which to control or systematically vary properties, such as $pK_a$.

Homopolymers of styrene-based derivatives (R=styrene) of imidazole (X, Y, Z=H), 2-methylimidazole (X=Me), 2-ethylimidazole (X=Et), 4-methylimidazole (Y=Me) and 2-ethyl-4-methylimidazole (X=Et, Y=Me) were been synthesized. With the $pK_a$ values of these imidazole structural groups (7-9.5), any polymer membrane containing them is capable of facilitated transport of $CO_2$ as bicarbonate anion (FIG. 1), based on the $1^{st}$ $pK_a$ of $H_2CO_3$ (6.35). At room temperature, each of the homopolymers has been observed to be glassy rather than rubbery. Those materials containing imidazole with greater degrees of substitution were more flexible (i.e., less glassy) indicating that substitution not only has an effect on $pK_a$, but also on polymer physical properties. However, the materials transition to the rubbery state at 40-60° C. and/or upon exposure to moisture in the air. This behavior is a positive indication that these membranes will be rubbery and hygroscopic under the $CO_2$ capture conditions, which promotes high transport rates of $CO_2$. Furthermore, the imidazole-styrene monomers (e.g., FIG. 3) were co-polymerized with PEG-acrylates, IL-based monomers, other imidazole-styrene monomers, and other monomers.

A series of imidazole-based homopolymers and co-polymers with systematically varied molecular structures were synthesized to experimentally determine the relationships between the imidazole group, polymer composition, and $CO_2$ permeability and selectivity at conditions relevant to post-combustion $CO_2$ capture. Imidazole-based monomers (e.g., FIG. 3) were synthesized in the laboratory in useful quantities (>5 g) with purities of at least 98%.

Example 2

Monomer Synthesis

An example synthetic method for an imidazole-based monomer is as follows: A 250 mL 2-necked round-bottomed flask equipped with a reflux condenser, volumetric addition funnel, and a magnetic stir bar was charged with a solution of sodium bicarbonate (5.25 g, 0.0625 mol) in a liquid mixture of 50 mL of water and 50 mL of acetone. Imidazole (13.6 g, 0.2 mol) was then added. Vinylbenzylchloride (7.6 g, 0.05 mol) was added drop-wise to the mixture over a period of about 10 minutes from the addition funnel. The flask was lowered into an oil bath thermostatted at 50° C., and the mixture was stirred for 20 hours.

The acetone was removed from the reaction mixture by rotary evaporation, and the residue was dissolved in 500 mL of diethyl ether. The solution was washed with 6×50 mL of deionized water, whereby the unreacted imidazole and any other water-soluble components were completely removed. Then, the product in the ether phase was back-extracted using 3×100 mL of a 2 M aqueous solution of hydrochloric acid. The solution was cooled in a refrigerator, and then 200 mL of a 4 N aqueous solution of sodium hydroxide was added to the hydrochloric acid solution. The deprotonated imidazole monomer product separated from the aqueous phase in the form of oil droplets. The product was via extraction with 3×50 mL of diethyl ether. A small amount of a quinone-based inhibitor was added, and the ether phase was dried with anhydrous magnesium sulfate, and the solvent removed via rotary evaporation. The product was further dried under dynamic vacuum (<1 torr). $^1$H NMR revealed an essentially pure imidazole monomer.

Example 3

Polymer Membrane Fabrication and Characterization

Thin films of homopolymers are produced via photopolymerization of imidazole-styrene monomers with increasing $pK_a$ based on imidazole, 2-methylimidazole, 2-ethylimidazole, 2-isopropylimidazole, 4-methylimidazole, and 2-ethyl-4-methylimidazole based on a technique as described in Bara et al., *Indust Eng Chem Res* 2007, 46(16):5397-5404; Bara et al., *Indust Eng Chem Res* 2008, 47(24):9919-9924; Bara et al., *Polymers Adv Tech* 2008, 19 (10):1415-1420; Bara et al., *J Membrane Sci* 2008, 321(1):3-7; Bara et al., *J Membrane Sci* 2008, 316(1-2):186-191; Bara et al., *Indust Eng Chem Res* 2009, 48(9): 4607-4610; Bara et al., *Acct Chem Res* 2010, 43(1):152-159; and Bara et al., *J Membrane Sci* 2007, 288(1-2):13-19.

An example membrane preparation is detailed herein. The monomer (about 2 g) at 99 wt % is combined with a suitable photoinitiator (e.g., 2-hydroxy-2-methylpropiophenone) at 1 wt %. The solution is warmed and then homogenized using a vibrating stand mixer. Two identical, 6"×6" quartz plates of ¼" thickness are cleaned, and then coated with an agent that bonds to the quartz surface as a monolayer (e.g., Rain-X). This coating aids in the eventual release of the polymer from the plates. A highly porous polymer support (e.g., Pall Supor® poly(ethersulfone)) is then cut to approximate dimensions of 60 cm×60 cm. The support is placed on the surface of one quartz plate, and the monomer-initiator mixture is then pipetted into the center of the support. The second quartz plate is then placed on top of the mixture and pressure is manually applied to distribute the monomer-initiator solution evenly and as thinly as possible. The plates are then placed in a reflective chamber and exposed to ultraviolet light with a wavelength of 254 nanometers. The polymerization reaction is allowed to proceed for about 3 hours. After this time, the ultraviolet light is switched off and the plates removed. A razor blade is inserted into the gap between the plates, and the top plate is liberated, leaving the supported polymer on the bottom plate. The razor is then used to carefully remove the polymer from the bottom plate, which is then transferred to a Teflon board. A steel cutting die of 47 mm diameter is then used to precisely cut the membrane from the bulk.

The remaining polymer is used for subsequent characterization via standard techniques including scanning electron microscopy (SEM) which is used to measure film thickness; differential scanning calorimetry (DSC), which is used to measure glass transition temperature; x-ray diffractometry (XRD) provides further information about polymer morphology; FT-IR which is used to calculate the degree of monomer conversion and estimate molecular weight; the goniometer is used to determine relative hydrophilicity/hydrophobicity via contact angle. The characterization data is utilized to correlate material performance with properties as well as suggest new polymers or co-polymers with tailored properties and improved $CO_2$ separation performance. Ideally, the membranes are hydrophilic and rubbery (operate above Tg), which will maximize $CO_2$ and water vapor transport as bicarbonate ($HCO_3^-$).

Example 4

Baseline Membrane Permeability/Permeance Testing $CO_2$ and $N_2$ permeability and $CO_2/N_2$ selectivity are measured using a modified version of "time-lag" apparatus as described in Bara et al., *Indust Eng Chem Res* 2007, 46(16): 5397-5404 and Bara et al., *Indust Eng Chem Res* 2007, 46(16):5380-5386. Membrane measurements are focused on the effect of temperature (25-60° C.) and humidity (amount of water present in gas) on $CO_2$ permeability and selectivity. These studies provide baseline property and performance data correlating $CO_2$ permeability and selectivity to polymer properties and the effect of $pK_a$ of the imidazole group on facilitated transport.

Single gas, baseline permeability measurements are conducted using time-lag membrane cells. An example procedure is as follows: The membrane is seated on top of a porous metal support and the system sealed using an o-ring and bolts. Dynamic vacuum is applied to both sides of the membrane, and the system is initially degassed for a period of about 16 hours. Temperature control is also initiated. After this time, the system is sealed and a single gas (e.g., $CO_2$) is introduced upstream at a desired pressure (e.g., 0.1-2 atm driving force against an initial state of about 0.001 atm downstream) and the temperature and pressure continuously monitored via inline transducers and thermocouples, respectively. The profile of the downstream pressure with time is collected and used to determine membrane permeability/permeance, gas diffusivity, and solubility. After steady-state flux has been observed for several hours, the system is purged under dynamic vacuum for a period of at least 16 hours. The experiments are replicated at least twice and repeated for other gases of interest (e.g., $N_2$). $CO_2/N_2$ selectivity is calculated as the ratio of their ideal permeabilities at a comparable driving force.

Water vapor permeability is measured in a manner similar to that reported in the literature (see LaFrate et al., *Indust Eng Chem Res* 2010, 49:11914-11919). A test cell is filled with water, covered with the membrane material to be tested, a seal created via an o-ring and the cell placed in an arid environment (desiccator, glovebox, or environmental chamber). The relative humidity in the cell is high (about 90% RH), and water vapor migrates across the membrane into the dry air (1-5% RH). Cells are placed in a desiccator filled with activated $CaSO_4$ (drierite) dessicant, and humidity monitored using a digital humidity gauge. The mass change in the cell is recorded with time, to determine the rate of water vapor transport out of the cell.

For larger scale experiments, an alternate method can be employed which uses a constant flow of dry $N_2$ gas through a portable glovebox (containing desiccant and a balance) to carry away moisture permeate. It is imperative that relative humidity outside the cells remains constant, since it provides the driving force for the experiment and could lead to discrepancies in water vapor flux through the membrane. The glovebox/chamber method is advantageous over the desiccator for large experiments because the cells remain in the test environment for the entire experiment (even during weighing).

Example 5

Membrane Permeability/Permeance Under Simulated Operating Conditions

Membrane permeability testing under simulated operating conditions is conducted. Experimental conditions focus on gas mixtures containing 10-15% $CO_2$ with 10-15% $H_2O$ with the balance $N_2$ at temperatures of 25-60° C. and a total upstream pressure of 1 atm, against a reduced pressure (vacuum) downstream. The multicomponent gas mixtures are analyzed in real-time via gas chromatography-mass spectrometry (GC-MS). The permeability, diffusivity, and solubility data obtained from these experiments are used to calculate the improvements achieved in $CO_2$ permeability and selectivity via the facilitated transport mechanism in the imidazole-containing polymer membranes.

Example 6

Computational Studies

Structure calculations from COSMOtherm are used to identify additional substitution patterns that can be useful for controlling the $pK_a$ of the imidazole group which enables facilitated transport. These computationally suggested imidazole groups are then synthesized as monomers and polymerized to test their properties and membrane performances.

In this aspect of the project, optimized molecular structures (i.e., coordinate files of lowest energy conformers) of the representative imidazole moieties present in the polymer and their corresponding protonated imidazolium forms are first generated through Turbomole. These coordinate files are then processed within COSMOtherm to produce a charge screening surface which can be used to generate accurate physical, chemical, and thermodynamic data for the species of interest. COSMOtherm is then utilized to simulate properties such as specific volume, $pK_a$ and reaction equilibria as a function of temperature with $CO_2$ (as carbonic acid). These data are utilized to identify alternative imidazole groups and/or substitution patterns for improving or changing membrane performance and in estimating reaction kinetics and transport rates. Correlation of COSMO-generated data with experimental data is made where possible to determine the quality of fit and any systematic adjustments that must be made in the application of the computer-generated data.

Based on the results obtained for the imidazole-based homopolymers, co-polymers formed from imidazole-based monomers with PEG monomers, polymerizable ILs, and other materials known to have high $CO_2$ permeability are being characterized and tested in the same manner so as to determine what potential benefits and synergistic membrane performances might be achieved through blending.

Homopolymer and co-polymer membranes are further tested as composites containing "free" imidazole molecules. It has been demonstrated that the parent imidazole molecules are of very low volatility with comparable $pK_a$ values to the N-functionalized analogues. Thus, the inclusion of small, hydrophilic, non-polymerizable imidazole molecules within the polymer membrane can add to the rate of facilitated transport of $CO_2$ as $HCO_3^-$. Additionally, consideration is also given as to tailoring these materials to create facilitated transport membranes with specific interactions with other target gases such as $SO_2$ and $H_2S$. The rate of transport for $H_2S$ can be faster than that of $CO_2$, because it does not require water. As such, imidazole cores with $pK_a$ values in the range of 7.0-7.5 can provide highly selective transport for $H_2S$ as bisulfide (HS—) anion over $CO_2$. For $SO_2$, which forms a stronger acid with water, imidazoles with much lower $pK_a$ values (through the inclusion of electron withdrawing groups) are used for facilitated transport of this species. These polymer membranes contain chloro-, nitro- and nitrile-substituted imidazoles or benzimidazoles, which exhibit much lower $pK_a$ values (<4.0), and can reversibly transport $SO_2$ as bisulfite anion.

Example 7

Computer Simulations of Imidazole-Containing Polymer Membranes

Membrane design can benefit from the insight provided by molecular simulations, especially as computational speed and algorithm development has progressed over the last decade. Within the last few years, a few simulation studies of $CO_2$ adsorption in polymeric materials have emerged. See Cozmuta et al., *J Phys Chem B* 2007, 111(12):3151-3166; Neyertz et al., *Macromolecules* 2010, 43(18):7813-7827; Pandiyan et al., *Macromolecules* 2010, 43(5):2605-2621. Two main aspects have been probed in these polymer models, which are also probed herein, including adsorbate selectivity and relative diffusion. There are many challenges associated with these systems, including their high molecular weights (requiring large system sizes) and the efforts needed to generate relaxed polymer configurations. Initial studies have confirmed that the bulk polymer behavior dominates the overall performance of the membrane (eliminating the need to simulate an explicit gas-polymer interface). Thus, the modeling work described herein is based on bulk polymer structures. In addition, the reactive Monte Carlo (RxMC) technique (see Johnson et al., *Mol Phys* 1994, 81(3):717-733; Smith et al., *J Chem Phys* 1994, 100(4):3019-3027) is applied to model the herein described functionalized polymers, to capture the reactive adsorption behavior of the gases. In particular, the replica exchange version of this technique (RE-RxMC) (see Turner et al., *J Phys Chem C* 2007, 111(43): 15706-15715) is used, which has previously shown "orders-of-magnitude" efficiency increases in dense systems.

Previous examples in the literature have established methodological guidance for simulating gas adsorption in polymer membrane materials (PET, PVOH, PVDC, PCTFE, PP, and PI). See Cozmuta et al., *J Phys Chem B* 2007, 111(12):3151-3166. Unfortunately, since polymers have relatively high molecular weights and demonstrate highly-correlated motions, a great deal of care is often needed to ensure proper relaxation and efficient sampling procedures. A hierarchy of simulation approaches are implemented, mainly drawing from molecular modeling techniques (see Allen, M. P.; Tildesley, D. J., *Computer Simulation of Liquids*. Oxford University Press: Oxford, 1989; and Frenkel, D.; Smit, B., *Understanding Molecular Simulations: from Algorithms to Applications*. Academic Press: San Diego, 2002), supplemented with electronic structure calculations. The intent is to maintain a solid connection with the experimental systems, and leverage the insight revealed by the models, to guide the rational development of polymeric membranes (structure and chemistry) for industrial gas separations. Several properties of the membranes are being investigated via the simulation approaches. For simplicity, the analysis can be subdivided into properties that are more related to the polymer structure versus properties that can be more related to specific chemical interactions between the adsorbate and the functionalized polymer.

In general, the polymer membrane is treated as a bulk polymer, so that the direct simulation of the gas-polymer interface is avoided. While the surface of the membrane can influence the performance, the focus is on the bulk polymer behavior, which is expected to dictate the overall adsorption selectivity, capacity, and diffusivity. Within this context, the permeability (P) is equated to the product of the solubility (S) and the diffusion coefficient (D). Permselectivity ($\alpha_{i,j}$) is then maximized by enhancing the relative diffusivity or relative solubility of different species (i or j). In the modeling work, the permselectivity is connected to the underlying molecular characteristics of the membranes, with the benefit of simultaneously being able to establish solid experimental benchmarks.

Example 8

Structural Analysis

A main aspect of the membranes that is being probed is the structure. Due to the highly-correlated movements of polymeric materials, it is unrealistic to expect that a simulation could predict the global energy minimum of the system. However, it is feasible to generate realistic (and very representative) structures, which can provide detailed, molecular-level insights into the systems. The models should be considered local minima on the global potential energy surface, and as such, an ensemble of these structures can be generated for detailed thermochemical analysis. There is a suite of structural analysis techniques (Gelb et al., *Langmuir* 1998, 14 (8):2097-2111) that are being applied to the membrane models, and these techniques are consistent with procedures that have been previously applied to characterize porous glass structures. The structural analysis includes the following components: pore size distribution, pore connectivity/surface area, and chemical/physical adsorbent-adsorbate interactions, including surface energy/adsorbate chemical potential, adsorbate diffusion/transport, reactive adsorption, and NMR chemical shifts.

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods and combinations of various features of the compounds and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated

What is claimed is:

1. A method for capturing carbon dioxide from a gas stream, comprising:
feeding the gas stream through an imidazole-containing polymer membrane, wherein the polymer membrane is formed by polymerizing an imidazole monomer and optionally one or more additional monomers, wherein the imidazole monomer has the following structure:

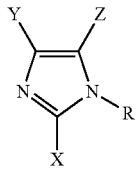

wherein:
R is a polymerizable group; and
X, Y, and Z are each independently selected from the group consisting of hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl, substituted or unsubstituted aryl, substituted or unsubstituted amino, cyano, nitro, and $CO_2CH_3$.

2. The method of claim 1, wherein R is a vinyl-containing group or an acrylate-containing group.

3. The method of claim 1, wherein R is a substituted or unsubstituted styrene.

4. The method of claim 3, wherein the substituted styrene is α-methylstyrene.

5. The method of claim 1, wherein X, Y, and Z are all H.

6. The method of claim 1, wherein at least one of X, Y, and Z are selected from the group consisting of $C_{1-6}$ alkyl and amino.

7. The method of claim 1, wherein at least one of X, Y, and Z are selected from the group consisting of halogen, nitro, cyano, and $CO_2CH_3$.

8. The method of claim 1, wherein Y and Z are combined to form a substituted or unsubstituted aryl, substituted or unsubstituted cycloalkyl, or substituted or unsubstituted cycloalkenyl.

9. The method of claim 1, where the one or more additional monomers are used and are selected from the group consisting of divinylbenzene, substituted or unsubstituted styrene, and acrylate.

10. The method of claim 9, wherein the substituted styrene is α-methylstyrene.

11. The method of claim 1, wherein the polymer membrane further comprises one or more metal cations.

12. The method of claim 1, wherein the gas stream is a flue gas or post-combustion gas stream.

13. The method of claim 1, wherein the polymer membrane has a $pK_a$ of from about 7 to about 9.5.

14. The method of claim 1, wherein the polymer membrane is at least partially protonated.

15. The method of claim 1, wherein R is a methacrylate-containing group.

16. The method of claim 1, wherein the one or more additional monomers are used and are methacrylate.

17. The method of claim 1, wherein the one or more additional monomers are used and are methylmethacrylate.

18. A method for sweetening a natural gas feed stream, comprising:
feeding the natural gas feed stream through an imidazole-containing polymer membrane, wherein the polymer membrane is formed by polymerizing an imidazole monomer and optionally one or more additional monomers, wherein the imidazole monomer has the following structure:

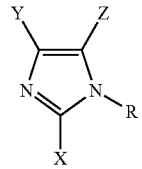

wherein:
R is a polymerizable group; and
X, Y, and Z are each independently selected from the group consisting of hydrogen, halogen, hydroxyl, substituted or unsubstituted $C_{1-20}$ alkyl, substituted or unsubstituted $C_{2-20}$ alkenyl, substituted or unsubstituted $C_{2-20}$ alkynyl substituted or unsubstituted aryl, substituted or unsubstituted amino, cyano, nitro, and $CO_2CH_3$;
to form a purified natural gas feed stream.

19. The method of claim 18, wherein R is a vinyl-containing group or an acrylate-containing group.

20. The method of claim 18, wherein R is a substituted or unsubstituted styrene.

21. The method of claim 20, wherein the substituted styrene is α-methylstyrene.

22. The method of claim 18, wherein Y and Z are combined to form a substituted or unsubstituted aryl, substituted or unsubstituted cycloalkyl, or substituted or unsubstituted cycloalkenyl.

23. The method of claim 18, wherein the polymer membrane further comprises one or more metal cations.

24. The method of claim 18, wherein R is a methacrylate-containing group.

* * * * *